Figure 1:
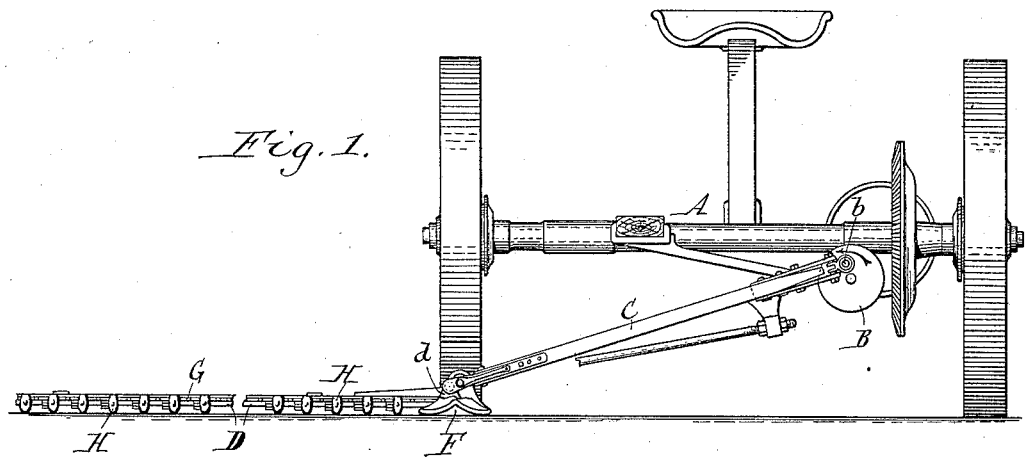

No. 679,213. Patented July 23, 1901.
T. S. BROWN.
CUTTER MECHANISM FOR HARVESTERS.
(Application filed Oct. 4, 1900.)
(No Model.) 2 Sheets—Sheet 1.

Witnesses:
Henry L. Deck.
F. F. Schuyinger.

Thos. S. Brown, Inventor.
By Wilhelm & Bonner,
Attorneys.

No. 679,213. Patented July 23, 1901.
T. S. BROWN.
CUTTER MECHANISM FOR HARVESTERS.
(Application filed Oct. 4, 1900.)
(No Model.) 2 Sheets—Sheet 2.
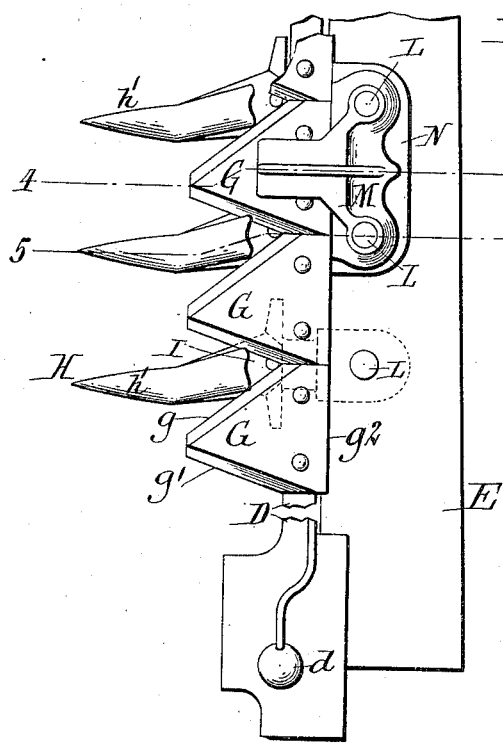
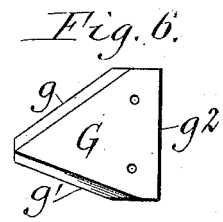
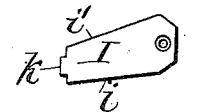
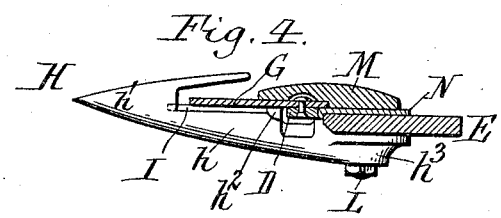
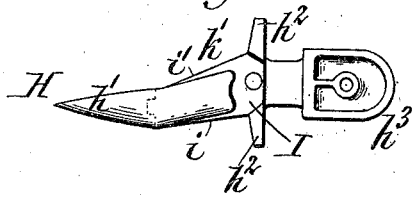
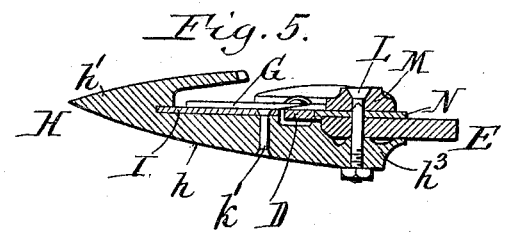
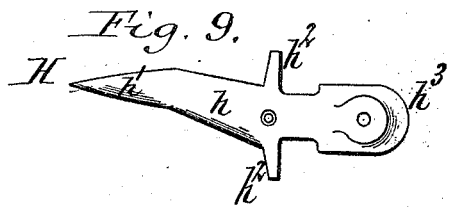
Witnesses:
Henry L. Deck.
E. A. Volk.
Thos. S. Brown, Inventor.
By Wilhelm & Bonner
Attorneys.

UNITED STATES PATENT OFFICE.

THOMAS STUART BROWN, OF POUGHKEEPSIE, NEW YORK, ASSIGNOR TO ADRIANCE, PLATT & COMPANY, OF SAME PLACE.

CUTTER MECHANISM FOR HARVESTERS.

SPECIFICATION forming part of Letters Patent No. 679,213, dated July 23, 1901.

Application filed October 4, 1900. Serial No. 31,992. (No model.)

*To all whom it may concern:*

Be it known that I, THOMAS STUART BROWN, a citizen of the United States, and a resident of Poughkeepsie, in the county of Dutchess and State of New York, have invented a new and useful Improvement in Cutter Mechanism for Harvesters, of which the following is a specification.

This invention relates to that class of cutter mechanisms for mowers, harvesters, and similar machines which contain a reciprocating cutter-bar arranged at right angles to the line of draft and provided with cutter sections or blades which have two forwardly-converging cutting edges and which coöperate with stationary cutters on the guard-fingers, over which the reciprocating sections move back and forth. In this class of machines the cutter-bar receives its reciprocating motion by a pitman from a crank-shaft which is arranged at a considerable height above the level of the cutter-bar. The pitman therefore stands at a considerably greater angle to the cutter-bar while the crank moves through the upper half of its revolution than while it moves through the lower half. This causes the cutter mechanism to be less effective during the upper half of the revolution of the crank, partly by reason of the less effective angle of the pitman and partly by reason of the greater frictional resistance of the cutter-bar in its ways resulting therefrom. When the crank moves outwardly during the upper half of its revolution the crank is less effective during the outward stroke of the cutter-bar than during the inward stroke. When the crank moves inwardly during the upper part of its revolution the crank is less effective during the inward stroke. For these reasons the power required for performing the cut is unequal on the outward and inward strokes. My invention compensates for this difference in the action of the cutter mechanism during the outward and inward strokes by making the angle of the cutting edges of each section smaller or less steep, and therefore longer, on the less effective side of the sections than on the more effective side, at the same time preserving the same angle of cut on each side. This increases or enhances the cutting action on the less effective side of the reciprocating sections and renders the power required for performing the cutting action substantially alike on the outward and inward strokes. In order to prevent any unequal cutting action by reason of these differently-inclined cutting edges on the reciprocating sections, the stationary cutting edges on the guard-fingers are also arranged at unequal angles and in such manner that they form like cutting angles with the two edges of the reciprocating sections, and in order that the guard-fingers may properly enter and divide the standing grass or grain the axial line of the point of each finger is arranged parallel with the line of draft or at right angles to the front of the finger-bar.

Figure 2:
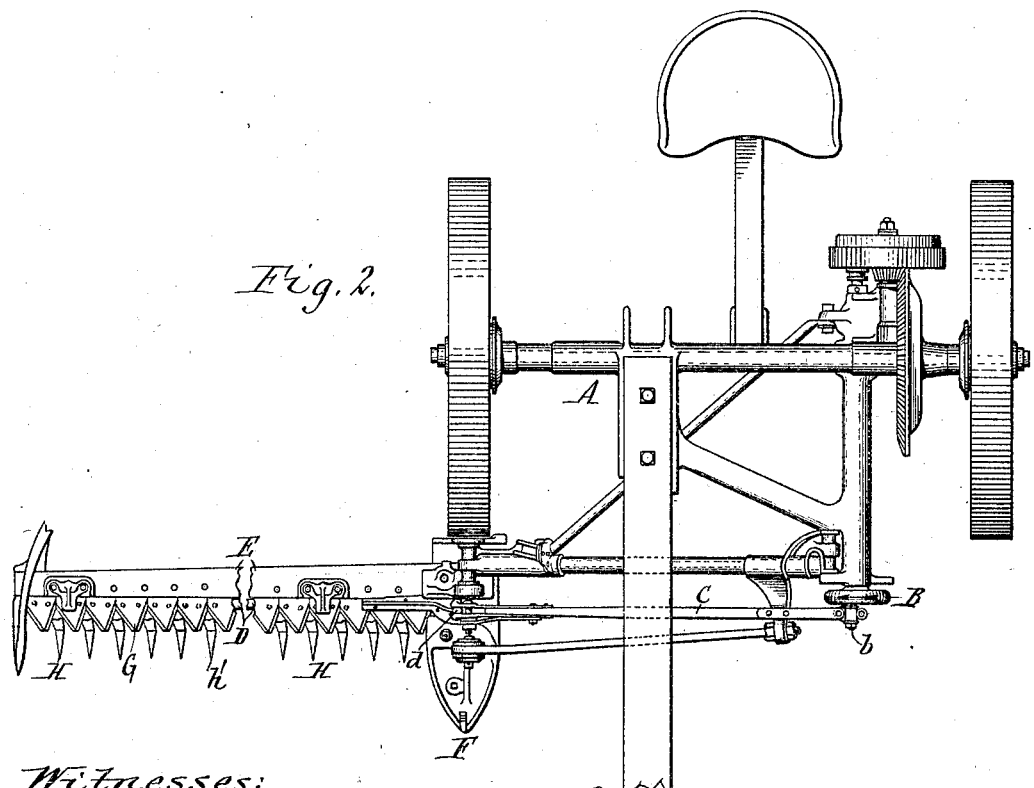

In the accompanying drawings, consisting of two sheets, Figure 1 is a front elevation of a mower provided with my improved cutting mechanism. Fig. 2 is a top plan view of the same. Fig. 3 is a fragmentary top plan view, on an enlarged scale, of the inner portion of the cutter-bar and connecting parts. Figs. 4 and 5 are vertical longitudinal sections in lines 4 4 and 5 5, Fig. 3, respectively. Fig. 6 is a plan view of one of the reciprocating sections or blades. Fig. 7 is a plan view of one of the stationary cutters or blades which are secured to the guard-fingers. Fig. 8 is a top plan view of one of the guard-fingers. Fig. 9 is a bottom plan view of the same.

Like letters of reference refer to like parts in the several figures.

A represents the wheeled frame of a mower; B, the crank-wheel by which the cutter-bar is actuated; $b$, the crank-pin thereof; C, the pitman connecting the crank-pin with the knuckle $d$ on the reciprocating cutter-bar D; E, the finger-bar, which is arranged at right angles to the line of draft, as well as the cutter-bar, and F the inner shoe. All of these parts may be of any suitable or well-known construction.

G represents the cutter sections, knives, or blades, which are secured to the upper side of the cutter-bar, as usual. These sections have the usual triangular configuration; but instead of having the two forwardly-converging cutting edges $g\ g'$ of each section arranged at the same angle to the base $g^2$ the cutting edge $g$ on the less effective side of the section is arranged at a smaller or less steep angle than the cutting edge $g'$ on the more effective side. This renders the cutting edge on the less effective side longer than that on the more effective side of the section and enhances or facilitates proportionately the cutting action on the less effective side, whereby the detrimental effect of the greater angle of the pitman during the less effective stroke is compensated for and the cutting action is rendered practically uniform on both the outward and inward strokes. When the crank-pin moves outwardly during the upper half of its revolution, in which case the pitman is least effective on its outward stroke, the outer cutting edge of each section is made longer and less steep than the inner edge, as shown in the drawings. When the crank-pin moves inwardly during the upper half of its revolution, the arrangement of the cutting edges is reversed, the inner edge being made longer and less steep than the outer edge.

H represents the guard-fingers, which are secured to the finger-bar and project forwardly therefrom. I represents the stationary cutter-blades, which are secured to these guard-fingers, as usual, and over which the reciprocating sections G move back and forth. Each of these finger-blades has its axial line arranged at an oblique angle laterally to its base and has its two cutting edges arranged at unequal angles. The cutting edge $i$ of each finger-blade, which lies on the side of the blade toward which the axial line of the blade is deflected, is so much steeper than the other edge $i'$ that these two edges form like cutting angles with the two unequally-inclined cutting edges $g$ $g'$ of the adjacent reciprocating blades G, with which they coöperate. In order to properly support this laterally-deflected finger-blade, the body $h$ of the guard-finger, upon which the finger-blade is secured, is similarly deflected laterally, so as to lean inwardly, as shown, if the inward stroke is the more effective stroke and outwardly if the arrangement of the cutting edges is reversed. The point $h'$ of the guard-finger which stands in front of its laterally-deflected body is arranged with its axial line parallel with the line of draft or at right angles to the front of the finger-bar, so that it enters the standing grass or grain straight in the line of draft and divides the same properly on both sides.

Each finger-blade I is provided at its front end, as usual, with a tenon $k$, which enters a recess in the finger, and the rear end of each of these blades is arranged, as usual, with its beveled corners between shoulders at the inner ends of the laterally-projecting arms $h^2$ of the guard-finger and is secured by a rivet $k'$.

Instead of forming the stationary cutting edges $i$ $i'$ on separate finger-blades they may be formed directly on the body of the finger, if the latter is made of suitable metal.

The shank or palm $h^3$ of the guard-finger, which extends rearwardly from the body $h$ and is secured to the finger-bar, is also arranged with its axial line parallel with the line of draft, but on one side of the axial line of the point. The axial line of the body $h$ of the guard-finger extends obliquely in a horizontal plane from the axial line of the shank to that of the point.

The shank or palm $h^3$ of each guard-finger is secured to the finger-bar, on the lower side thereof, by any suitable means—for instance, a bolt L. Some of these bolts serve at the same time to secure the usual buttons M, which are applied at intervals to the upper side of the finger-bar for guiding and confining the cutter-bar. These bolts are correspondingly longer than the bolts which do not pass through such buttons.

N represents the usual wear-plates, which are arranged between the finger-bar and the buttons M and against which the cutter-bar bears with its rear side.

I claim as my invention—

1. The combination with a cutter-bar and a finger-bar arranged at right angles to the line of draft, an actuating-crank arranged higher than the cutter-bar, and a pitman connecting said crank with the cutter-bar, of cutter-sections secured to said reciprocating cutter-bar and having unequally-inclined cutting edges, the edge on the less effective side of the section being arranged at a smaller angle to the base of the section than that on the more effective side, substantially as set forth.

2. The combination with a cutter-bar and a finger-bar arranged at right angles to the line of draft, an actuating-crank arranged higher than the cutter-bar, and a pitman connecting said crank with the cutter-bar, of cutter-sections secured to said reciprocating cutter-bar and having unequally-inclined cutting edges, the edge on the less effective side of the section being arranged at a smaller angle to the base of the section than that on the more effective side, and guard-fingers provided with differently-inclined cutting edges arranged to form like cutting angles on both sides of each finger, substantially as set forth.

3. The combination with a cutter-bar and a finger-bar arranged at right angles to the line of draft, and an actuating mechanism for reciprocating the cutter-bar arranged higher than the cutter-bar, of cutter-sections secured to said cutter-bar and having unequally-inclined cutting edges, the edge on the less effective side of the section being arranged at a smaller angle than that on the more effective side, and guard-fingers having their bodies arranged obliquely, in a horizontal plane, to the finger-bar, and their points arranged parallel with the line of draft, substantially as set forth.

4. The combination with a cutter-bar and a finger-bar arranged at right angles to the line of draft, and an actuating mechanism for reciprocating the cutter-bar arranged higher than the cutter-bar, of cutter-sections secured to said cutter-bar and having unequally-inclined cutting edges, the edge on the less effective side of the section being arranged at a smaller angle than that on the more effective side, and guard-fingers having their bodies arranged obliquely, in a horizontal plane, to the finger-bar and provided with unequally-inclined cutting edges arranged to form like cutting angles on both sides of each finger and their points arranged parallel with the line of draft, substantially as set forth.

5. The combination with the finger-bar, of a guard-finger having its point and its palm arranged at right angles to the finger-bar and laterally out of line and having its body extending obliquely from the palm to the point, substantially as set forth.

6. A guard-finger having the axial lines of its point and its palm arranged parallel to each other and laterally out of line and having its body extending obliquely from the palm to the point, substantially as set forth.

7. A guard-finger having the axial lines of its point and its palm arranged parallel to each other and laterally out of line and having its body extending obliquely from the palm to the point and provided with cutting edges which are arranged at unequal angles, substantially as set forth.

8. A finger-blade having its axial line arranged at an oblique angle, laterally, to its base and having its two cutting edges arranged at unequal angles, the cutting edge on the side toward which the axial line is deflected being arranged at a steeper angle than that on the other side of the blade, substantially as set forth.

Witness my hand this 2d day of October, 1900.

THOS. STUART BROWN.

Witnesses:
 HOWARD A. SOMERS,
 TUNIS ACKERMAN.